Feb. 4, 1969  R. W. SHAW, JR  3,425,718

FLANGED TRANSITION JOINT FOR DISSIMILAR METALS

Filed March 22, 1966

United States Patent Office 3,425,718
Patented Feb. 4, 1969

3,425,718
FLANGED TRANSITION JOINT FOR DISSIMILAR METALS
Robert W. Shaw, Jr., Louisville, Ky., assignor to Chemetron Corporation, Chicago, Ill., a corporation of Delaware
Filed Mar. 22, 1966, Ser. No. 536,446
U.S. Cl. 285—173      4 Claims
Int. Cl. F16l *19/02, 25/00*

This invention relates to joints for effecting connections between dissimilar metals and has for its principal object the provision of an improved transition joint for connecting components of dissimilar metals in systems and equipment for transportation, storage and other handling of fluids at low and ultra-low temperatures.

By the term "dissimilar metals" as used herein, it is intended to mean metals the major constitutents of which differ so widely in metallurgical and chemical properties, and especially in their fusion temperatures, that they cannot be satisfactorily joined by conventional fusion welding or brazing techniques, such as ferrous and nonferrous metals, e.g., stainless steel and aluminum. This is in distinction to metals which differ primarily only in the nature of their alloying elements, such as, for example, stainless steel and chrome-moly steel, which normally can be satisfactorily joined by proper application of conventional welding or brazing techniques.

Systems and equipment of the nature specified above frequently require the making of strong, tough and leakproof connections between components comprised of such dissimilar metals. As an example, in the refrigeration industry it is common to employ systems in which components comprised of two or more of the metals, copper, aluminum and stainless steel, are connected to one another. Another field in which the making of sound and reliable connections between components of dissimilar metals is becoming increasingly important is that of "cryogenics," which involves manufacture, storage and transportation of fluids at utra-low temperatures, some of which fluids may be highly corrosive or otherwise extremely hazardous. In cryogenic systems, components such as heat exchangers, tanks, vessels and other "coldbox" equipment may be constructed of aluminum, titanium or other metal having the required properties for such applications while it may be necessary or desirable to use a ferrous metal, generally stainless steel because of its corrosion resistance properties and low heat transfer characteristics (a heat conductivity rate of the order of one-eighth that of aluminum), for the piping and fittings connected to such components. For example, storage tanks and vessels for highly corrosive and cryogenic-hazardous fluids commonly comprise an inner shell of aluminum, for reasons of economics and because of its light weight and imrovement in structural qualities at very low temperatures, which is suspended in and insulated from an outer shell of carbon steel, and to which inner shell external connections are made by stainless steel piping, joined to the aluminium shell, to mitigate heat leakage to the inner shell from the atmosphere surrounding the outer shell. In all such applications, by virtue of the critical and sometimes hazardous service conditions involved, it is mandatory that there be provided between the dissimilar metals a strong, sound and tough joint which has very high integrity as to leak-tightness, insensitivity to thermal and mechanical shock and resistance to vibration. This is particularly true as to cryogenic tanks and vessels such as mentioned above and like equipment wherein joints between an inner aluminum shell and stainless steel piping connections are inaccessibly located in the sealed insulation space between the inner and outer shells.

Various expedients have been employed for making joints between dissimilar metals of the nature contemplated herein, but almost invariably they have been found unsatisfactory to meet the rigid requirements such as outlined above because of one or more disadvantages such as lack of mechanical strength, complex and costly fabricating procedures, deficiency in leak-tightness or inability to withstand thermal or mechanical shocks or vibration over extended periods of service. With conventional flanged and bolted joints, although generally capable of providing good mechanical strength, they nevertheless have proved unreliable as to leak-tightness, leading to costly fluid losses in low temperature services. Various soldering techniques have been used, but it has been found that, while capable of affording initial leak-tightness if properly fabricated, soldered joints generally are structurally weak and also may have other disadvantages including sensitivity to moisture corrosion resulting in failure of the joint due to embrittlement or other deterioration of the bond over a period of time. Where brazing techniques are employed, carefully controlled and sometimes complex procedures are required, and, even so, difficulties are encountered due to, among other things, the generally wide difference in coefficients of expansion of the dissimilar base metals to be joined and the occurrence of intermetallic alloys or interfaces which are brittle and have low strength or lack soundness, especially in low temperature service involving thermal or mechanical shock conditions. Fusion welding of dissimilar metals, like brazing, if properly performed is capable of affording an initially leak-tight joint. Such joints, however, lack mechanical strength, and prevention of weld porosity is extremely difficult. The occurrence of the brittle interface phenomenon (e.g., the formation of an intermetallic phase of brittle aluminum-iron alloy in the case of fusion welding of aluminum and stainless steel) is even more pronounced than in the case of brazing, apparently due to the great differences in fusion temperatures which generally characterize dissimilar metals of the nature herein contemplated (for example, about 2650° F. for stainless steel as compared with about 1200° F. for aluminum). The high sensitivity to thermal shock, cyclic pressure pulsations and fluctuations in mechanical loading, due to such brittle interface, renders fusion welding generally unsatisfactory for the joining of dissimilar metals. In fact, experience seems to indicate that the formation of such undersirable weakening brittle interface is characteristic of any technique involving fusion by externally applied heat of one or more of the elements of a joint between dissimilar metals, resulting in a joint which is deficient in reliability insofar as concerns mechanical strength, soundness, and ability to maintain leak-tightness under conditions of thermal and mechanical shock, especially in ultra-low temperature services.

In effecting connections between dissimilar metal components of low temperature fluid handling systems, such as between a stainless steel pipe or fitting and another pipe or vessel of aluminum, it is a common practice to employ tubular transition pieces or joints rather than joining the components directly to each other. Such transition joints generally comprise two tubular sections of dissimilar metals respectively identical with, or corresponding to (in the sense of compatability for joining by conventional procedures), the dissimilar metals of the components to be connected. These tubular sections are joined to each other at one end by various techniques, including those mentioned above, while the free end of each section is adapted to be readily joined by conventional procedure to the respectively corresponding metal component of the system. In the cases of many such transition joints as heretofore proposed, however, there have been encountered problems and deficiencies the same as or similar to those previously discussed insofar as concerns the joint between the two tubular sections, while some of them also have been subject to one or more other disadvantages, including undue complexity, costly construction, or excessive length or other dimensions which render them unsuitable for use in confined locations such as in the insulated space between the inner and outer shells of a cryogenic fluid storage vessel. A further disadvantage characteristic of some of the tubular transition joint constructions as heretofore available is the presence of cavities or crevices in the walls of the flow passage in which fluid may become entrapped. In many service applications such entrapment may prove extremely hazardous, possibly even resulting in explosions.

It is a principal object of the present invention to provide an improved tubular transition joint for effecting connections between dissimilar metal components in low temperature fluid storage and handling systems and similar applications, which is of strong, rigid and leak tight construction, possesses a high degree of reliability from the standpoint of insensitivity to thermal and mechanical shock and vibration, and is free of fluid entrapping cavities and crevices in the walls of the flow passage, while at the same time being of simple design lending itself to production at relatively low cost.

This objective is accomplished in general by the provision of two axially aligned tubular elements, each of which has an axially extending tubular portion provided at one end with a flange portion extending radially outward therefrom substantially normal to the common axis of the tubular elements, an annular composite bimetal plate, and bolts or other suitable fastening means tightly clamping the tubular elements together with the flange portions in opposed face-to-face relationship and the bimetal plate disposed in sealing relation between the faces of the flange portions, the tubular portions being comprised of dissimilar metals corresponding respectively to the dissimilar metals of two system components which it is desired to interconnect, and the bimetal plate also being comprised of dissimilar metals corresponding respectively to those of the two tubular portions. By the term "corresponding," as used above and in the ensuing description and claims, it is meant that the metals so referred to are either identical or so similar in the nature of their major constituents as to be compatible for joining together by ordinary fusion welding techniques.

In the transition joint as generally described above, it usually is preferable that the tubular and flange portions of each of the tubular elements be of one piece integral construction. In some instances, however, as will be described more fully hereinafter, it may be desirable or necessary that one or both of the tubular elements be fabricated from separate tubular and flange portions which are welded together.

The composite bimetal plate, which constitutes an important feature of the present invention, comprises two parallel extending layers respectively of dissimilar metals which are joined together by cold pressure welding, by which is meant the appplication of sufficient pressure to produce a strong and sound solid phase bond between the engaging surfaces of the metal layers, substantially without the supply of extraneous heat, or at least without the supply of sufficient heat to cause fusion of the metal of either of the layers. By such process, the bonding together of the layers is effected essentially as a result of pressure-induced plastic flow of the metals, and there is avoided the formation of a brittle interface or intermetallic alloy phase between the layers such as is characteristic of joints between dissimilar metals as produced by fusion welding, brazing or other processes which depend on heat fusion of one or more of the metals entering into the joint. Bimetal plates suitable for employment in the practice of the present invention have been produced by pressure roll bonding techniques. The particular manner of producing such plates, however, forms no part of the present invention. Suffice it to say that there are available such plates comprised of layers of dissimilar metals wherein the cold pressure welded bond, sometimes referred to as a mechanical-metallurgical bond, between the layers has a high degree of mechanical strength and soundness and a high integrity of leak-tightness against the passage of fluid under pressure or vacuum between the layers.

For additional structural strength and sealing integrity in the transition joint of the present invention, such bimetal plate is clamped between the flange portions of tubular elements such as above described, by bolts or other suitable fastening means applied to the flange portions, and the layers of the bimetal plate are welded respectively to the corresponding ones of the dissimilar metal tubular portions. The plate is provided with an opening having the same diameter as the inside diameter of the tubular elements and is disposed in alignment with the bores of those elements so as to insure a smooth flow passage through the transition joint. Each of the layers of the plate is in overall face-to-face engagement with the flange portion of the tubular elements of corresponding metal, and a continuous seal is made around the entire periphery of each tubular portion between it and the adjacent corresponding metal layer of the bimetal plate. Such seal welds, constituting an important feature of the invention, are so located and applied as to eliminate any cavities or crevices at the junctions between the tubular portions and the bimetal plate and, the junction between the inner edges of the layers of the plate itself being smooth and leak-tight, there is thereby produced a smooth bore through the transition joint so that no fluid may become entrapped at any point in the walls of the bore. In general, the seal welds at the inner peripheries of the joints between the bimetal plate and the tubular portions are entirely adequate to insure leak-tightness of these joints. For some applications, however, it may be desirable to provide additional reinforcement by applying continuous seal welds also around the outer peripheries of these joints. For maximum effectiveness, the plate preferably should be of sufficient radial extent to completely overlie the whole of the opposed contact surfaces of the flange portions. In some cases, for purposes of additional sealing integrity, heat radiation or for other reasons, it may be desirable for the plate to extend out somewhat beyond the outer peripheries of the flange contact surfaces, but generally this will not be necessary.

Installation of the transition joint to interconnect two dissimilar metal components of a fluid handling or storage system may be readily accomplished by welding each of the free ends of the dissimilar metal tubular elements directly to the component which is of corresponding metal.

For a more detailed description of the invention and for further objects and advantages thereof, reference is to be had to the following description taken in conjunction with the accompanying drawings. Although, as will be evident from the foregoing, the basic principles and features of the invention may be employed in the construction of transition joints for interconnecting various couples of dissimilar metals, the invention is hereinafter descrbed in detail, for purposes of examples, as applied to transition joints for interconnecting components of aluminum and stainless steel.

Figure 1:
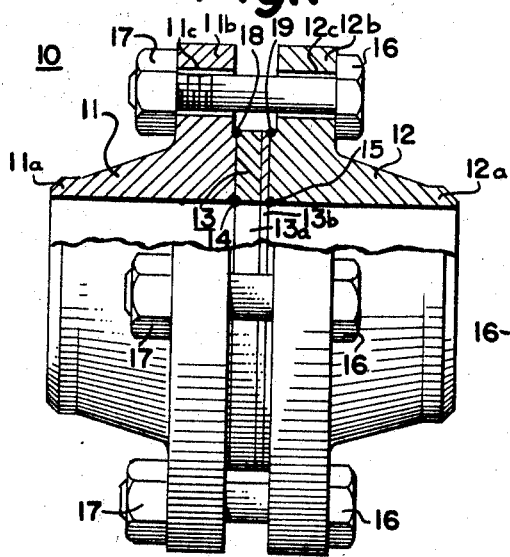
FIG. 1 is an elevational view, partly in section, of one construction of a flanged transition joint embodying the present invention.
Figure 2:
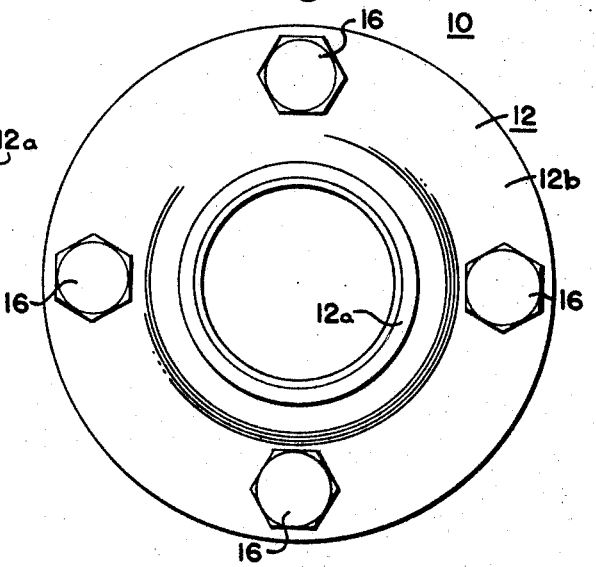
FIG. 2 is a right hand end view of the joint shown in FIG. 1.

In the embodiment illustrated in FIGS. 1 and 2, wherein the complete joint is designated by the numeral 10, there are provided two tubular elements in the form of pipe flange means 11 and 12 which are of the kind commonly referred to as "weld neck" flanges. These flanges are of identical design in which the tubular and flange portions of each, i.e., the portions 11a and 11b of flange 11 and the portions 12a and 12b of flange 12, are of integral one-piece construction. As is well known, such weld neck flanges provide a high degree of resistance to bending moments. In accordance with the present invention, these flanges are made of dissimilar metals, the flange 11 being comprised of aluminum or a suitable high strength aluminum alloy, both referred to herein for brevity simply as aluminum, while the flange 12 is comprised of stainless steel. In the completed transition joint, the flanges are assembled with their flange portions 11b and 12b in opposed face-to-face relationship so that their contact surfaces extend radially in substantially parallel planes transverse or perpendicular to the common axis of the tubular portions 11a and 12a. As will be noted, the diameters of the bores of these tubular portions are the same.

Interposed between the contact surfaces of the flanges is a bimetal annular plate 13 of the kind hereinbefore generally described, comprising two layers of dissimilar metals, i.e., a layer 13a of aluminum and a layer 13b of stainless steel, corresponding respectively, to the aluminum and stainless steel of flanges 11 and 21. The engaging faces of the dissimilar metal layers 13a and 13b are mechanically metallurgically bonded to each other so as to provide a sound, strong and leakproof joint between the layers. A bimetal plate material which has been found highly suitable for the purpose is that produced by roll-bonding of the aluminum and stainless steel layers and sold by Aluminum Company of America under the trademark "Duranel." Such plate not only has a high degree of mechanical strength and rigidity, but also integrity from the standpoint of capability to withstand pressure and temperature fluctuations and mechanical vibration at the ultra-low temepratures encountered in cryogenic applications. The cold pressure welded bond betwen the layers also is of such soundness and absence of weld porosity as to afford a high reliability of leak-tightness of the joint between the two layers.

The bimetal plate 13 is provided with a central opening which, as will be noted from the drawings, is of the same diameter as the inside diameters of flanges 11 and 12 so that the inner periphery of the plate is flush with the walls of the flange bores, thereby providing a smooth and uniform flow passage. A continuous seal weld 14 is applied between the aluminum flange 11 and the corresponding aluminum layer 13a, extending completely around the junction between the inner peripheries of those two elements, such weld being readily accomplished by fusion welding due to the corresponding nature of the metals involved. Similarly, a continuous seal weld 15 is applied between the stainless steel flange 12 and the corresponding stainless steel layer 13b, extending completely around the junction between the inner peripheries of these last mentioned two elements. These seal welds not only provide integrity from the standpoint of assuring against fluid leakage by way of the joints between the bimetal plate and the flanges, but also they insure a full uniform and unobstructed flow passage through the joint 10, devoid of any cavities or crevices that might entrap fluid. It is preferable in the interest of maximum effectiveness, as previously pointed out, that the bimetal plate 13 extend radially outward from the bore a sufficient distance to overlie the contact faces of flanges 11 and 12. In some cases, for additional sealing integrity, or to increase heat radiation from the transition joint when it is welded into place, the bi-metal plate may be made to extend out somewhat beyond the outer diameters of the raised contact faces of the flanges. Also, additional seal welds 18 and 19, corresponding respectively to the inner welds 14 and 15, may be provided around the outer periphery of the bimetal plate at its juncture with the flanges 11 and 12, although this is not generally necessary.

For the purpose of providing additional structural strength and rigidity, the tubular elements 11 and 12 are clamped together by suitable fastening means. In the illustrated embodiment this is accomplished by the provision of a series of bolt holes 11c and 12c (only one of each being shown in the drawings) around the flange portions 11b and 12b, respectively, and radially outward of the tubular portions 11a and 12a, which accommodate clamping bolts 16 and associated nuts 17. By tightening these bolts, the flange portions are drawn into tight clamping engagement with the bimetal plate 13 so as to reinforce the joints afforded by the inner seal welds 14 and 15, as well as the outer seal welds 18 and 19 if provided. In the preferred form of the invention, to carry the thrusts and moments on the joint 10 and mitigate any resulting strains on the bimetal plate, the bolts should be made of material corresponding to that one of the dissimilar metals which has the higher coefficient of thermal contraction and expansion. Thus, in the illustrated exemplary embodiment, the bolts are made of aluminum. As a result, when the joint is cooled down to cryogenic temperatures, the aluminum bolts have a greater overall contraction than the stainless steel parts of the joint, resulting in a bolt stress increase and a tighter joint. In some cases, especially cryogenic applications where the use of hydrocarbon and like lubricants is to be avoided, it has been found advantageous to employ distilled water as a lubricant for the bolts and nuts. In such cases it has been found preferable to employ stainless steel nuts on the aluminum bolts, since aluminum-to-aluminum connections have a tendency to gall with water lubrication.

Figure 3:
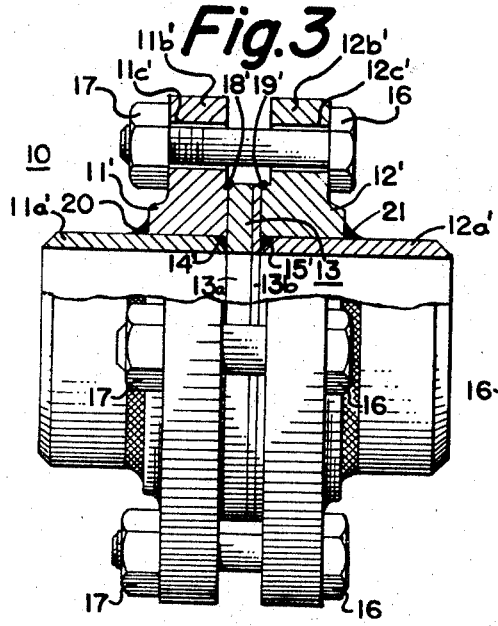
FIG. 3 is an elevational view, partly in section, of a modification of the construction shown in FIG. 1.
Figure 4:
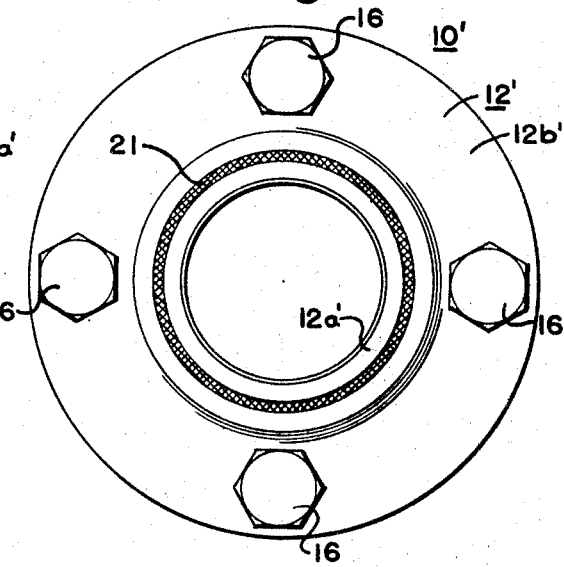
FIG. 4 is a right hand end view of the joint shown in FIG. 3.

In FIGS. 3 and 4 there is illustrated a modification 10' of the flanged transition joint of the present invention, which modification is particularly adapted for installations involving flow passages of such small diameter as to make it difficult to apply internal seal welds, such as 14 and 15 of the construction illustrated in FIGS. 1 and 2, after final assembly of the parts of the transition joint. For purposes of clarity, the parts of the transition joint 10' which correspond to the parts of the transition joint 10 previously described have been provided with corresponding reference characters in the drawings.

The construction illustrated in FIGS. 3 and 4 differs from that illustrated in FIGS. 1 and 2 primarily in that the flanged tubular elements are fabricated from separate tubular and flange portions. More particularly, as will be noted from the drawing, the tubular element 11' includes a tubular portion 11a' and a flange portion 11b', while the tubular element 12' includes a tubular portion 12a' and a flange portion 12b'. The flange portions 11b' and 12b' are of the kind sometimes referred to as "slip-on" flanges. As in the case of the joint previously described, the tubular portion 11a' and the flange portion 11b' of tubular element 11' are made of aluminum, while the tubular portion 12a' and the flange portion 12b' of tubular element 12' are made of stainless steel. Although, as in the case of the transition joint first described, any suitable means may be employed for clamping the flange portions together, in the construction illustrated they are provided with circumferentially spaced bolt holes 11c' and 12c' for accommodation of clamping bolts 16 with associated nuts 17.

In the assembly of the modified transition joint 10', the aluminum tubular portion 11a' is butt welded, as indicated at 14', to the aluminum layer 13a of the bimetal plate 13 adjacent the inner periphery of the latter, such welding being readily accomplished from the outside of the tubular portion. Similarly, the stainless steel tubular portion 12a' is butt welded, as indicated at 15', to the stainless steel layer 13b of the bimetal plate. Butt welds 14' and 15' provide continuous circumferential seals as in the case of the previously described seal welds 14 and 15, and are so applied as to eliminate any cavities or crevices at the junctures of the tubular portions 11a' and 12a' with the bimetal plate 13 at the inner peripheries of these parts, thereby assuming a smooth walled bore through the transition joint. Aluminum flange portion 11b' and stainless steel flange portion 12b' then are slipped onto the aluminum tubular portion 11a' and stainless steel tubular portion 12a', respectively, until the contact surfaces of the flange portions engage the faces of the corresponding aluminum layer 13a and stainless steel layer 13b of the bimetal plate. Flange portions 11b' and 12b' then are fillet welded to tubular portions 11a' and 12a', respectively, as indicated at 20 and 21. Thus, in the embodiment of FIGS. 3 and 4, all of the welds between corresponding ones of the dissimilar metal parts can be accomplished readily outside of the bores of the tubular elements. Finally, bolts 16 are inserted through aligned openings 11c' and 12c' of the flange portions 11b' and 12b', respectively, and nuts 17 are applied to the bolts and drawn up to effect tight clamping of the assembly. As in the case of the joint 10 illustrated in FIGS. 1 and 2, the joint 10' of FIGS. 3 and 4 may be provided with additional seal welds 18' and 19' extending around the outer peripheries of the layers 13a and 13b of the bimetal plate at their junctures with the contact surfaces of flange portions 11b' and 12b'.

From the foregoing it will be seen that the construction of the flanged transition joint 10' illustrated in FIGS. 3 and 4 provides the same advantages as that of the joint 10 illustrated in FIGS. 1 and 2, while having the additional advantage of facilitating assembly of the joint in those cases where the bores of the tubular elements are of such small diameter as to render it impractical to apply the seal welds from the interior. The construction of FIGS. 3 and 4, however, is not necessarily restricted to joints having small diameter bores.

Both embodiments of the transition joint construction herein described and illustrated are adapted for ready connection between dissimilar metal components of fluid handling or storage systems or equipment by direct butt welding of the free ends of the tubular elements, 11a and 12a or 11a' and 12a', respectively, to the corresponding metal components. For instance, an aluminum-stainless steel transition joint, such as herein described by way of specific example, may be employed in providing inlet or outlet connections to an inner aluminum shell of a cryogenic fluid storage vessel by butt welding the end of the aluminum tubular element to an outlet provided in such shell and butt welding the stainless steel tubular element to a stainless steel pipe, fitting or valve of an external piping system.

It is to be understood that the present invention is not limited to the details of the exemplary embodiments herein described and illustrated, but rather is subject to further modifications as well as being suitable for the provision of transition joints for interconnecting dissimilar metals other than aluminum and stainless steel, all within the scope of the appended claims.

What is claimed is:
1. A transition joint for connecting components of dissimilar metals in systems for handling of fluids at low and ultra-low temperatures comprising two axially aligned tubular elements, each having an axially extending tubular portion provided at one end with a flange portion extending radially outward therefrom substantially normal to the common axis of said tubular elements, said flange portions being positioned in face-to-face relation, one of said tubular portions being comprised of a metal dissimilar from the other said tubular portion and said dissimilar metals of said tubular portions corresponding respectively to the dissimilar metals of two system components which it is desired to interconnect, an annular composite bimetal plate comprising two parallel extending layers respectively of dissimilar metals corresponding respectively to those of said two tubular portions, said layers being joined together by a mechanical-metallurgical solid phase bond to provide a high degree of mechanical strength and soundness and a high integrity of leak-tightness against the passage of fluids between said layers, said annular plate being positioned between the opposed faces of said flange portions, said annular plate having an inside diameter corresponding to the inside diameter of said tubular elements and disposed in alignment with the bores of said tubular elements so as to insure a smooth flow passage through the transition joint, clamping means interconnecting said flange portions of said tubular elements to clamp said annular plate between the opposed faces of said flange portions, and a pair of continuous seal welds between the respective layers of said annular plate and the respective corresponding dissimilar metal tubular portions, each of said seal welds respectively extending around the entire inner periphery of each of said tubular portions between it and the adjacent corresponding metal layer of said annular plate, said seal welds being so constructed and arranged as to eliminate any crevices at the junctions between said tubular portions and said annular plate, the junction between the inner edges of said layers of said annular plate being smooth and leak-tight thereby providing a smooth bore through the transition joint so that no fluid may become entrapped at any point in the walls of the bore.

2. A transition joint according to claim 1 including a second pair of continuous seal welds respectively extending around the outer peripheries of said layers of said annular plate and bonding said layers to said corresponding faces of said flange portions of said tubular elements.

3. A transition joint according to claim 1 wherein said flange portions of said tubular elements are provided with a plurality of aligned openings located outside of the outer peripheries of said tubular portions, and
    said clamping means comprises a plurality of bolt means extending through said aligned openings.

4. A transition joint according to claim 1 wherein one of said tubular portions and one of said layers of said annular plate are stainless steel, and
    the other of said tubular portions and said other layer of said annular plate are aluminum.

References Cited

UNITED STATES PATENTS

| | | | |
|---|---|---|---|
| 2,446,481 | 8/1948 | Letterman | 285—286 X |
| 3,311,392 | 3/1967 | Buschow | 285—173 |

FOREIGN PATENTS 386,014  1/1933  Great Britain.

THOMAS F. CALLAGHAN, Primary Examiner.

U.S. Cl. X.R.

285—286, 363

UNITED STATES PATENT OFFICE
CERTIFICATE OF CORRECTION

Patent No. 3,425,718                              February 4, 1969

Robert W. Shaw, Jr.

It is certified that error appears in the above identified patent and that said Letters Patent are hereby corrected as shown below:

Column 4, line 23, "elements" should read -- element --; line 24, after "entire" insert -- inner --; line 63, "examples" should read -- example --. Column 5, line 29, "21" should read -- 12 --; line 41, "tempratures" should read -- temperatures --.

Signed and sealed this 28th day of April 1970.

(SEAL)
Attest:

Edward M. Fletcher, Jr.                    WILLIAM E. SCHUYLER, JR.
Attesting Officer                               Commissioner of Patents